J. R. Brown,
Pipe Coupling.
No. 103,423.  Patented May 24, 1870.
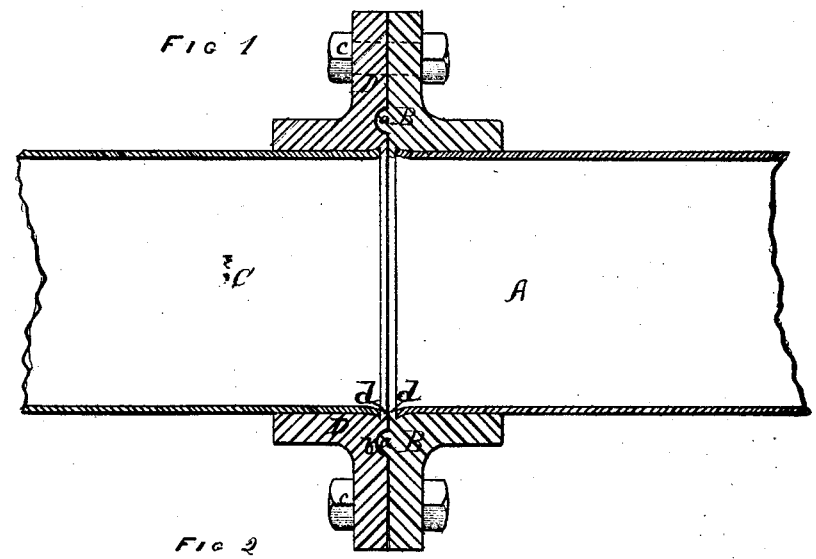
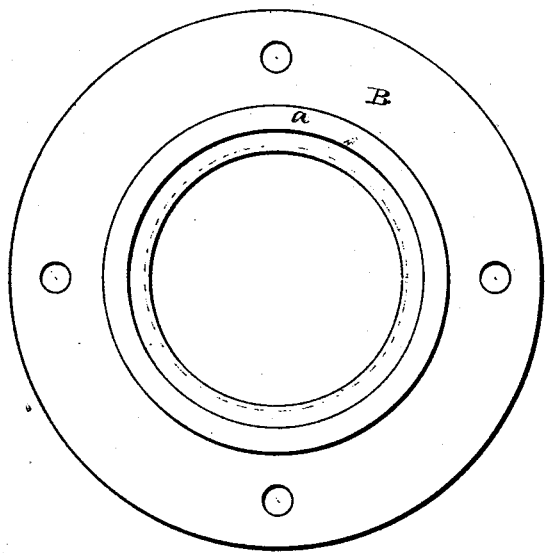

United States Patent Office.

JOSEPH R. BROWN, OF NEW HAVEN, CONNECTICUT.

Letters Patent No. 103,423, dated May 24, 1870.

IMPROVEMENT IN PIPE-COUPLINGS.

The Schedule referred to in these Letters Patent and making part of the same.

To all whom it may concern:

Be it known that I, JOSEPH R. BROWN, of New Haven, in the county of New Haven and State of Connecticut, have invented a new and useful Improvement in Couplings for Steam or Water-Pipes; and I do hereby declare that the following is a full and exact description of the same, reference being had to the accompanying drawings and to the letters of reference marked thereon.

Figure 1 is a longitudinal section, showing the two flanges together.

Figure 2 is a face view of the flanges.

Figure 3 is a section, showing the adaptation of my improvement to cast-iron pipes.

Similar letters of reference, when they occur in the separate views, indicate like parts.

My invention relates to an improvement in the method of jointing water or steam-pipes; and consists of a male and female flange, placed upon the ends of the pipe, and held there securely by having the pipe rolled or expanded into the flanges by an expanding-tool, the groove in the female flange to be filled with red lead or other suitable substance, and the whole held together by a sufficient number of bolts through the said flanges.

In large steam-pipes, where couplings with flanges are used, the great trouble has been that the packing, if rubber is used, soon becomes hard, by heat of the steam, and, in this condition, does not form an elastic packing, as originally, and the joint thus made becomes a leaky one, and has to be repacked, which can only be done when the steam is down, which often causes great inconvenience and expense. If cement be used for the packing, it requires a large amount of it, and is a very slow method of packing, and is very liable to be compressed out into the pipe.

It is also desirable to use very thin wrought-iron pipes, such as lap-welded boiler-flues, and the present method is to cut a screw on the end of the same, and making the joint by screwing the pipe so cut into couplings, which have a corresponding thread cut on the inside of the same. This method is very objectionable, because the thread or screw, to be of sufficient depth to make a perfect joint, cuts nearly through the pipe, making it very weak at this point, and soon rusts through or breaks off; also, screw-joints, on large pipe, are very difficult to make tight. With my improvement, however, I obviate all these objections and am able to form a perfectly tight, strong joint, with less labor and expense than can possibly be accomplished in any other method now made use of.

To enable others skilled in the art to make and use my improved coupling, I will proceed to describe the construction and operation of the same, with reference to the accompanying drawings.

A is a section of pipe, upon which the male flange B is placed, which is provided with the projection $a$, extending around it, as shown in fig. 2.

C is another section of pipe, upon which the female flange D is held, which is provided with a groove, $b$, to correspond with the projection $a$ upon the flange B.

When the flanges are jointed together, the groove $b$ is filled with red led or other suitable material, after which the male flange B is placed in position, the projection $a$ upon it enters the groove $b$, and displaces a certain portion of the substance used as packing, and the two flanges are in the relative positions as shown in fig. 1, where they are held by means of bolts $c$.

The steam or water can have no direct action upon the packing, as the joint is effectually broken, and the pressure is taken by the metal of the flange, and thus all liability to have the packing blown out is avoided.

Instead of being screwed upon the pipe, the flanges are cored out sufficiently to freely admit the full diameter of the said pipe. The core is made a little larger at or near the face of the flange, and tapers down to the outer end, as shown in the drawing. The flange is fastened upon the pipe by placing it over the tube, and inserting therein an expander, such as is commonly used in expanding boiler-tubes, and the end of the tube is expanded until a tight joint is formed.

Having thus fully described my invention,

What I claim as new and useful, and desire to secure by Letters Patent, is—

A pipe-coupling, in which the pipes A and B abut against the central flanges $d\ d$ of the sectional collar B D, having the recess $b$ and bead $a$, and are flared into recesses, and thus united to the collar by means of rolling, all substantially as described.

This specification signed and witnessed this 18th January, 1870.

JOSEPH R. BROWN.

Witnesses:
NOBLE P. BISHOP,
FRANK PRESCOTT.